Nov. 19, 1963     G. M. SNYDER     3,110,986
WORK HANDLING DEVICE FOR GRINDING MACHINES
Filed May 17, 1961     4 Sheets-Sheet 3
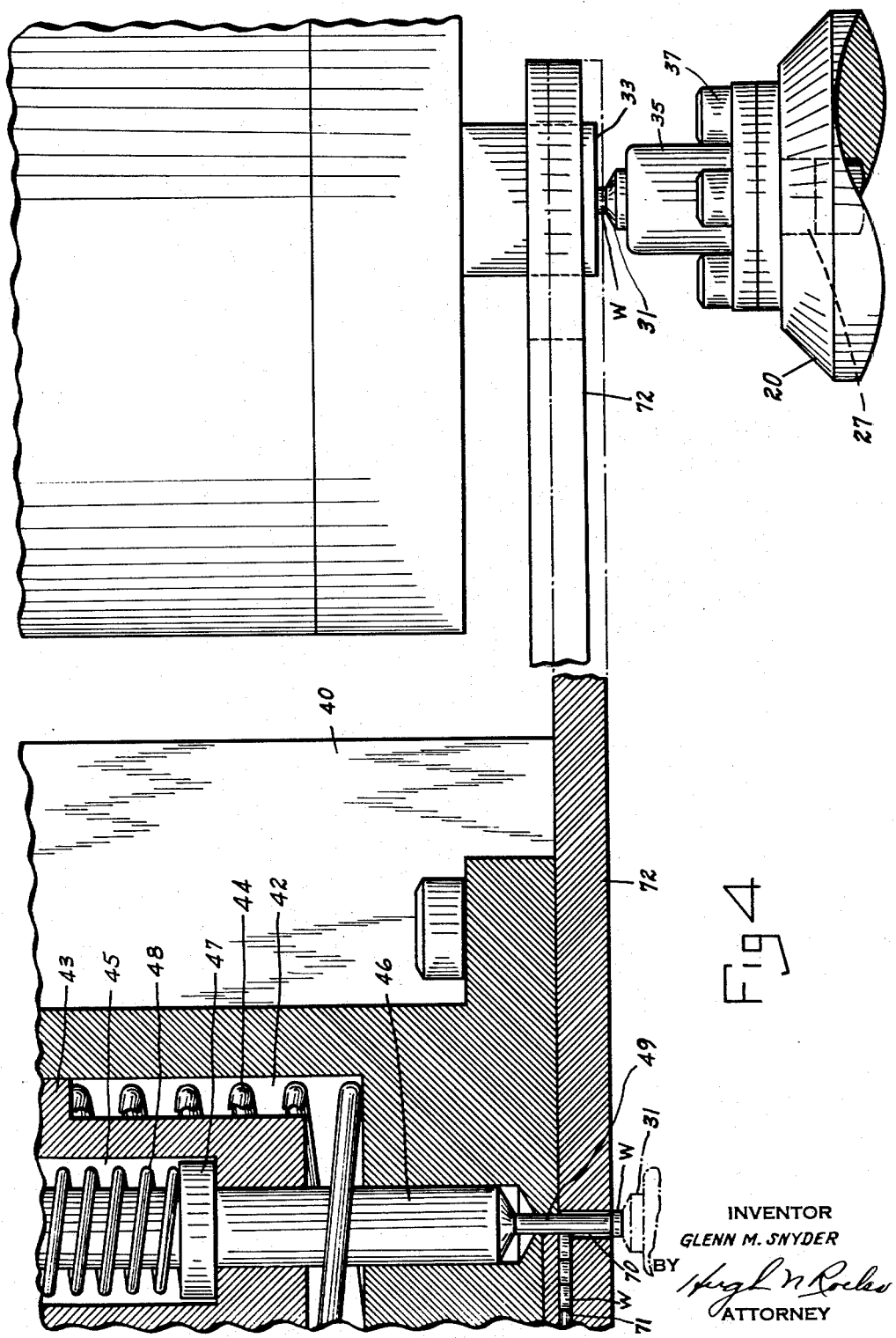
INVENTOR
GLENN M. SNYDER
BY
ATTORNEY

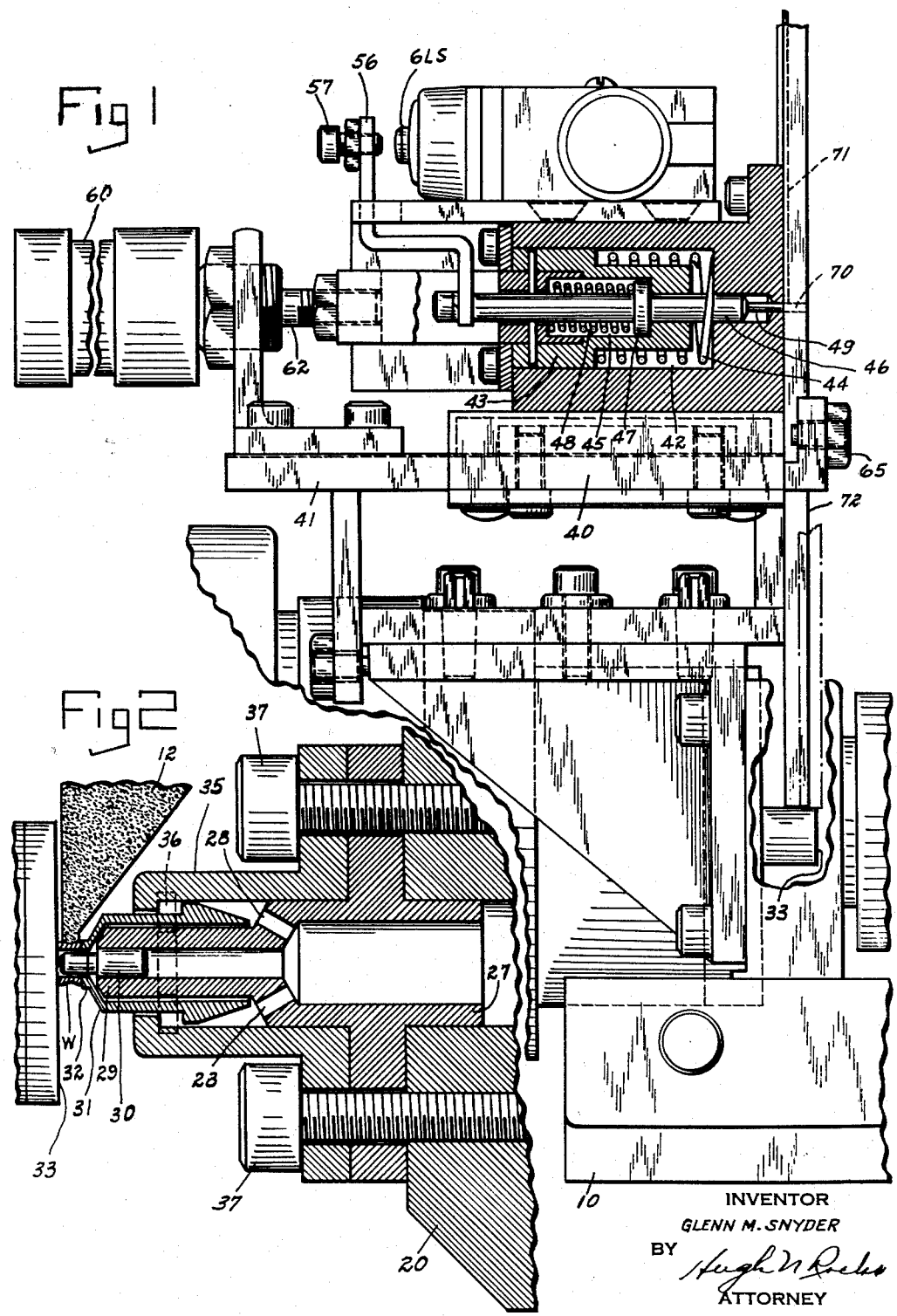

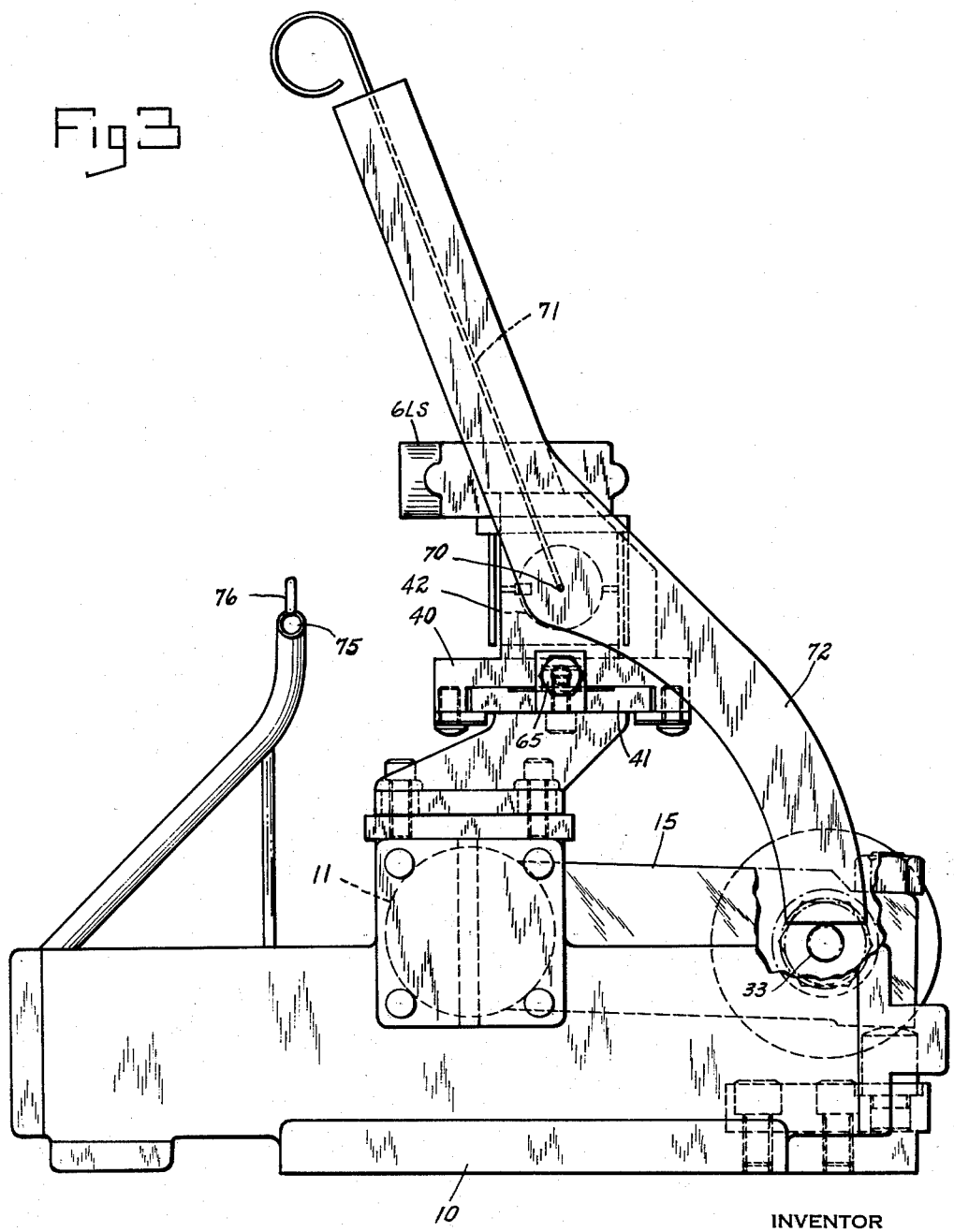

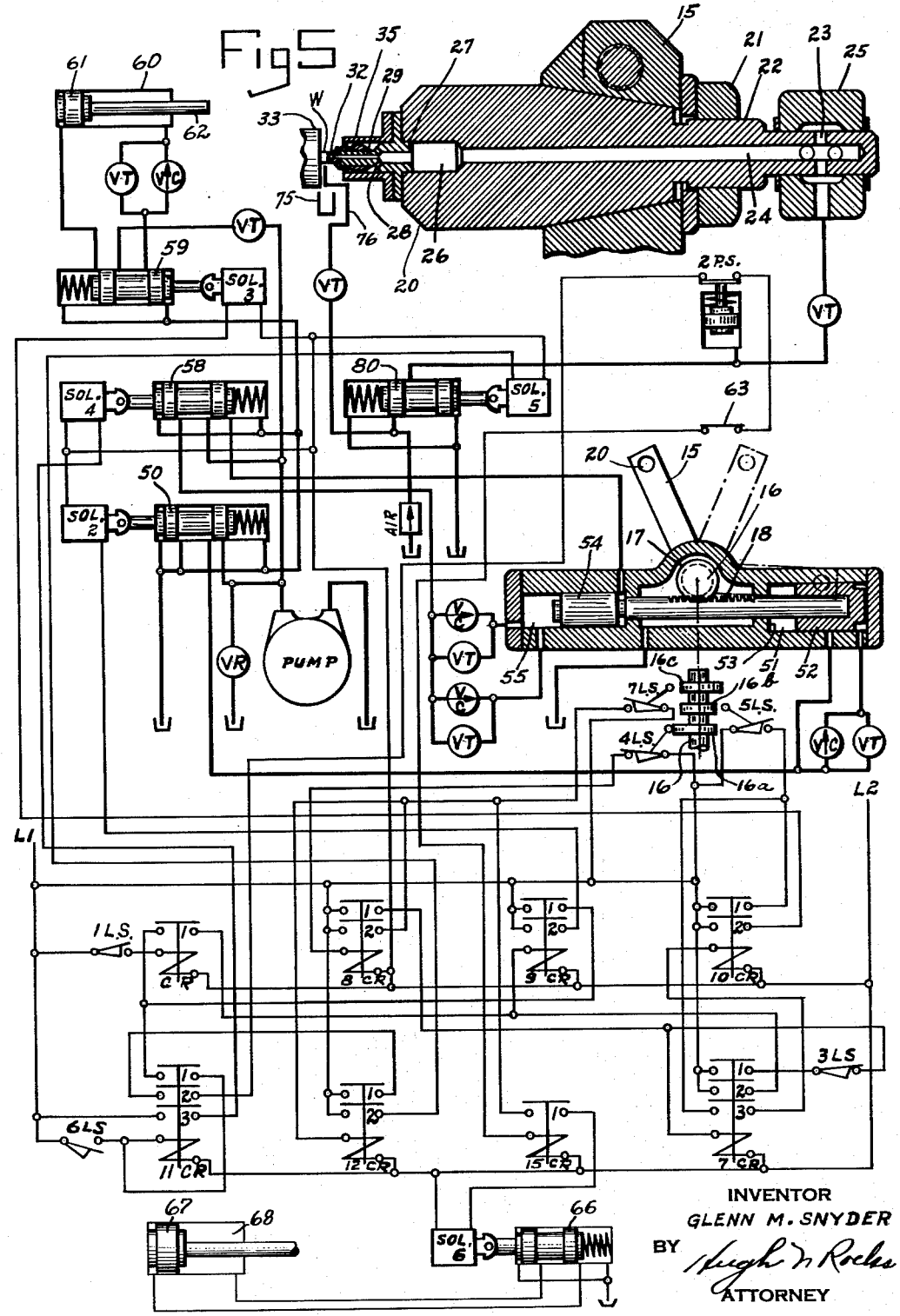

United States Patent Office 3,110,986
Patented Nov. 19, 1963

3,110,986
WORK HANDLING DEVICE FOR GRINDING MACHINES
Glenn M. Snyder, Waynesboro, Pa., assignor to Landis Tool Company, Waynesboro, Pa.
Filed May 17, 1961, Ser. No. 110,714
14 Claims. (Cl. 51—105)

The present invention relates to grinding machines, particularly machines for grinding rings for anti-friction bearings, and more particularly, to apparatus for loading and unloading rings of the size used in miniature bearings.

It is, therefore, an object of the present invention to provide a work feeder for feeding race rings to a loading device.

Another object is to provide a loading device for transferring rings from the work feeder to the point of operation in the grinding machine.

Another object is to provide means for holding a workpiece against a work rotating member during a grinding operation.

Another object is to provide control means for performing the various operations in a grinding cycle in predetermined sequence.

Another object is to provide means for stopping the machine cycle if the work feeder fails to place a workpiece on the loading device.

Another object is to provide means for stopping the machine cycle if the loading device fails to place a workpiece in position for grinding.

The apparatus of which this invention is a part is similar to that disclosed in U.S. Patents 2,694,883, granted November 23, 1954, and 2,874,518, granted February 24, 1959.

FIG. 1 is a partial sectional front elevation of a work feeder for miniature race rings.

FIG. 2 is a partial sectional plan view of a pressure-operated clamping device for holding miniature race rings against the driving face plate.

FIG. 3 is a right hand end elevation of a loading device for miniature race rings.

FIG. 4 is a partial plan view showing a clamping member and an arbor in work receiving position and in grinding position.

FIG. 5 is a hydraulic and electric diagram.

A grinding machine table or base 10 has a work loading device 11 mounted thereon. The work loading device 11 has a loading arm 15 arranged to move between a series of positions for loading, grinding and unloading workpieces.

Arm 15 is supported for oscillation on shaft 16. Pinion 17 on shaft 16 engages the teeth of rack member 18. Rack member 18 has one end slidably mounted in piston 52 which, in turn, is slidably mounted in cylinder 51. Movement of piston 52 to the left is limited by a stop surface 53 which is, in effect, the end of cylinder 51. Piston 54 is attached to the other end of rack member 18 and is slidably mounted in cylinder 55 of work loading device 11.

Also mounted on shaft 16 are a series of cams 16a, 16b, and 16c for actuating unload limit switch 4LS, load limit switch 5LS, and grind limit switch 7LS respectively.

The means for receiving a workpiece from the work feeder consists of a stud member 20 secured in the outer end of arm 15. Stud 20 is secured to arm 15 by means of nut 21 on threaded portion 22 of stud 20. Beyond threaded portion 22 is an end portion having radial openings 23 connected to a central passage 24. A rotatable connection 25 serves to admit fluid under pressure through openings 23 to passage 24.

Enlarged portion 26 of passage 24 has an adaptor 27 therein for receiving fluid under pressure and distributing said fluid through ports 28. Adaptor 27 has an extended portion 29 in which is inserted a removable and interchangeable arbor 30.

A clamping member 31 in the form of a thimble has an internal diameter larger than the diameter of portion 29, which provides a substantial clearance between clamping member 31 and extended portion 29. With such a clearance, the clamp may rotate with the work about the work axis even though the work axis and the axis of portion 29 do not coincide.

One end 32 of clamping member 31 is reduced in diameter to conform to the diameter of a portion of arbor 30 extending beyond extended portion 29 of adaptor 27. Reduced portion 32 is substantially the same diameter as workpiece W which it engages and holds against work rotating face plate 33. The other end of clamping member 31 is conical in shape with a short cylindrical portion at its maximum diameter. Clamping member 31 is of minimum size and weight and thus offers minimum inertia resistance and no frictional resistance to rotation by the workpiece.

Adaptor 27 and clamping member 31 are contained in cylindrical member 35 having a large inside diameter for the large diameter of said conical portion of clamping member 31, and a small diameter for the cylindrical portion of clamping member 31.

Opening 36 is provided in cylindrical member 35 in such a position that if there is no workpiece in grinding position, clamping member 31 will advance to a point where the large diameter of the conical portion will pass opening 36 sufficiently to permit the escape of air with a corresponding drop in air pressure. This drop in air pressure will be used to operate controls to interrupt the grinding cycle and prevent the advance of the grinding wheel 12.

It should be noted that the differences in diameters between the large diameter of the conical portion and the inside diameter of the cylindrical member 35 is such as to restrict the flow of air under pressure through the clearance space between the conical portion and cylindrical member 35 so as to provide an air bearing at this point and also to maintain sufficient pressure to hold clamping member 31 against workpiece W.

Extended portion 29 and cylindrical member 35 both have flange members to which they are fastened to stud member 20 by means of screws 37.

The means for placing a workpiece W on arbor 30 consists of a carriage 40 slidably mounted on bracket 41 and having a cylindrical bore 42 therein in which is slidably mounted a plunger 43 for movement against spring 44. Within plunger 43 is a bore 45 in which is slidably mounted a ram 46 having a collar 47 which is held against the bottom of bore 45 by means of spring 48.

One end of ram 46 has a reduced portion 49 arranged to enter opening 70 in work chute 71 to remove a workpiece from chute 71 and place it on arbor 30. Chute 71 forms an upper portion of guide plate 72 which is attached to and movable with carriage 40. The other end of ram 46 has an arm 56 mounted thereon and an adjustable screw 57 in arm 56 in position to actuate feed limit switch 6LS on carriage 40.

Carriage 40 is advanced and retracted for feeding workpieces by means of a fluid motor consisting of cylinder 60, piston 61 which is slidably mounted therein and connected to plunger 43 by means of piston rod 62. When plunger 43 is actuated by piston 61 in response to a signal at a predetermined point in the loading cycle, the movement of piston 61 is transmitted to carriage 40 through plunger 43 and spring 44.

Guide plate 72 and chute 71 are in a position slightly beyond the work engaging surface of face plate 33 to permit the passage of a workpiece from guide plate 72 to face plate 33 without interference which might have occurred if guide plate 72 and face plate 33 were flush. Thereafter, carriage 40 is reset and retracts guide plate 72 to a position behind the work engaging surface of face plate 33 to permit the unobstructed removal of the workpiece in the opposite direction.

When carriage 40 reaches the end of its stroke which is determined by stop screw 65, plunger 43 continues to move against spring 44 causing reduced portion 49 to enter opening 70 in chute 71 to transfer a workpiece to arbor 30. At the same time, screw 57 in arm 56 advances to actuate feed limit switch 6LS, the function of which will be described later.

If, for some reason or other, the workpiece fails to move out of chute 71, plunger 43 will continue to move, but ram 46 will remain stationary, spring 48 will be compressed, and arm 56 along with screw 57 will not move far enough to actuate feed limit switch 6LS. Failure to operate feed limit switch 6LS prevents the next step in the loading cycle.

Operation

In the automatic cycle, after the cycle has been started, cycle start relay 7CR is energized and deenergized in response to the energizing and deenergizing of relay 8CR and the opening and closing of relay contact 8CR1 by the movement of loading arm 15 and unload limit switch 4LS to and from unload position. In the unload position, unload limit switch 4LS closes to energize relay 8CR. Relay contact 8CR1 closes to energize cycle start relay 7CR.

Cycle start relay 7CR is held through relay contact 7CR1 and normally closed "wheelbase in" limit switch 3LS.

Relay contact 8CR2 closes to energize clamp relay 12CR.

Relay contact 12CR2 energizes clamp valve solenoid 5 to shift clamping member 31 to the left to remove workpiece W from arm 15.

Relay contact 7CR2 closes to energize loader relay 9CR.

Relay contact 9CR2 energizes loader valve solenoid 2.

Relay contact 9CR1 is a holding contact in a circuit with relay contact CR1.

Loader valve 50 directs fluid to the right end of cylinder 51 to shift piston 52 to the left to swing arm 15 in a clockwise direction. Piston 52 reaches the end of its stroke with arm 15 in the middle position as shown in dotted lines.

As soon as arm 15 leaves unload position, unload limit switch 4LS opens to deenergize relay 8CR.

Relay 7CR is held through relay contact 7CR1 and limit switch 3LS.

Piston 52 engages stop surface 53 of cylinder 51 or any suitable stop at this point.

Load limit switch 5LS operates in this position to complete a circuit through relay contact 7CR3 to energize feeder relay 10CR.

Relay contact 10CR1 is a holding contact around load limit switch 5LS.

Relay contact 10CR2 completes a circuit to energize feeder valve solenoid 3.

Feeder valve 59 directs fluid to actuate piston 61 and through piston rod 62 to shift plunger 43 and ram 46 to transfer a workpiece from chute 71 to arbor 30. This movement of plunger 43 actuates feed limit switch 6LS to complete a circuit to energize grind relay 11CR.

Relay contact 11CR1 closes to complete a holding circuit from relay contact 9CR1.

Relay contact 11CR3 closes to energize grind valve solenoid 4.

Grind valve 58 directs fluid under pressure to the right end of piston 54 in cylinder 55 to shift arm 15 in a clockwise direction from load position to grinding position.

In grind position, grind limit switch 7LS is closed to complete a circuit to energize clamp relay 12CR.

Relay contact 12CR2 completes a circuit to energize clamp valve solenoid 5.

Clamp valve 80 moves to a position to direct air to clamping member 31 to hold workpiece W against face plate 33. As soon as workpiece W is clamped against face plate 33, the air pressure operates to close pressure switch 2PS, to complete a circuit from previously closed relay contacts 11CR2 and 12CR1 to energize infeed relay 15CR.

Infeed valve solenoid 6 is energized by a circuit from grind limit switch 7LS through relay contact 12CR1 to shift valve 66 to direct fluid under pressure to the head end of piston 67 in cylinder 68, to advance grinding wheel 12 for a grinding operation.

The means for advancing grinding wheel 12 is similar to that disclosed in U.S. Patent 2,313,479, granted March 9, 1943 or in either of the patents referred to above.

If there is no workpiece in position for grinding, clamping member 31 will continue to move toward face plate 33 until the large diameter portion of clamping member 31 opens opening 36 to permit escape of a greater volume of fluid, thus dropping the pressure and opening pressure switch 2PS and opening the circuit to deenergize infeed relay 15CR.

Relay contact 15CR1 opens in the circuit to infeed valve solenoid 6 to prevent advance of grinding wheel 12 or to retract grinding wheel 12 if the advance has already started.

When grinding wheel 12 leaves retracted position, limit switch 1LS closes to complete a circuit to energize relay CR and close relay contact CR1 in the holding circuit to loader relay 9CR.

When grinding wheel 12 is in advanced position, limit switch 3LS is opened to deenergize cycle start relay 7CR.

Relay contact 7CR2 opens in the circuit to loader relay 9CR, but loader relay 9CR is held through relay contacts 9CR1 and CR1.

Relay contact 7CR3 opens to deenergize feeder relay 10CR and feeder valve solenoid 3 to reset piston 61 to retract guide plate 72 to unload position behind the surface of face plate 33.

At the end of the grinding operation, a time or size contact 63 is provided to open the circuit to infeed relay 15CR and retract grinding wheel 12.

In the back position of grinding wheel 12, limit switch 1LS is opened to deenergize relay CR and open relay contact CR1 in the circuit to loader relay 9CR.

Relay contact 9CR1 opens in the circuit to relay 9CR and also in the holding circuit to grind relay 11CR.

Relay contact 11CR3 opens to deenergize grind valve solenoid 4 to direct fluid to return arm 15 to unload position.

In this position, the finished workpiece is located for ejecting into discharge tube 75.

Air nozzle 76 directs a constant stream of air in the direction of discharge tube 75.

Also, in this position, unload limit switch 4LS is closed to energize relay 8CR.

Relay contact 8CR2 completes a circuit to again energize clamp relay 12CR and clamp valve solenoid 5 to advance clamping member 31 against the workpiece and remove said workpiece from arbor 30 in the direction of discharge tube 75.

This ejecting operation is assisted by continuous flow of air from air nozzle 76.

When relay 8CR is energized at this point, it initiates another cycle by closing relay contact 8CR1 to energize cycle start relay 7CR.

I claim:

1. In a grinding machine for grinding annular or ringlike workpieces, a rotatable work support including a face plate, a grinding wheel, an arm movable between a loading position, a grinding position and an unloading position and having means for receiving and carrying workpieces between said positions including an arbor, a clamping member on said arbor, a supply of fluid under pressure for actuating said clamping member to hold said workpieces against said face plate and for providing a fluid bearing for said clamping member, control means operable only when a workpiece is in grinding position for applying pressure to said clamping member, and other control means operable only when a workpiece is in unload or ejecting position for applying pressure to said clamping member.

2. In a grinding machine for grinding annular or ring-link workpieces, work rotating means including a face plate, a grinding wheel, control means for advancing and retracting said grinding wheel, an arm having means for receiving and carrying workpieces toward and from said face plate including an arbor, a clamping member substantially concentric with said arbor, a supply of fluid under pressure for actuating said clamping member to hold said workpieces against said face plate, means for operating said clamping member in the absence of a workpiece to permit the escape of a substantial volume of fluid under pressure with a corresponding drop in said pressure, and a pressure switch responsive to said drop in pressure to retract said grinding wheel.

3. In a grinding machine for grinding a peripheral surface of annular workpieces, work rotating means including a face plate, a grinding wheel, wheel feed control means, a loading arm having means for receiving and carrying workpieces toward and from said face plate, an arbor on said arm, a clamping member on said arbor and movable axially thereon to engage and hold a workpiece against said face plate, a supply of fluid under pressure for actuating said clamping member, said clamping member being movable to a more advanced position in the absence of a workpiece, means operable in response to such movement of said clamping member to cause a drop in pressure in said fluid supply, and a pressure switch responsive to said drop in pressure to prevent operation of said wheel feed control means.

4. In a machine tool in which a work loading device receives a workpiece from a work feeding device and carries said workpiece into machining position, said work feeding device comprising a carriage, a guide plate on said carriage for guiding a workpiece from said work feeding device to operative position in the machine, a plunger on said carriage, means for moving said plunger, a spring for transmitting the movement of said plunger to said carriage, a work feeding ram in said plunger for transferring a workpiece to said work loading device, a spring for holding said ram in a predetermined position in said plunger, a switch for signalling the completion of the feeding movement of said ram, and means movable with said ram for actuating said switch.

5. In a machine tool in which a work loading device receives a workpiece from a work feeding device and carries said workpiece into machining position, said work feeding device comprising a carriage, a guide plate on said carriage for guiding a workpiece from said work feeding device to operative position in the machine, a plunger on said carriage, means for moving said plunger, a spring for transmitting the movement of said plunger to said carriage, a work feeding ram in said plunger for transferring a workpiece to said work loading device, a spring for holding said ram in a predetermined position in said plunger, a switch for signalling the completion of the feeding movement of said ram, means movable with said ram for actuating said switch, the forces exerted by said spring being such that if the removal of said workpiece is obstructed, said spring will be compressed and said switch will not be operated to initiate the next movement of the cycle.

6. In a grinding machine, a grinding wheel, work rotating means comprising a face plate, a work holding magazine, a loading arm having means for engaging and transferring a workpiece from said magazine to said face plate, means for transferring a workpiece from said magazine to said loading arm comprising a bracket, a carriage slidably mounted on said bracket, a stop for limiting movement of said carriage on said bracket, a plunger in said carriage having means for engaging and shifting a workpiece from said magazine to said loading arm, a resilient connection between said plunger and said carriage, a hydraulic motor for moving said plunger and said carriage until said carriage engages said stop, means to continue the movement of said plunger against said resilient connection to remove a workpiece from said magazine, a switch, and means movable with said plunger to actuate said switch when said workpiece is on said loading arm to move said arm to grinding position.

7. In a grinding machine, a grinding wheel, work rotating means comprising a face plate, a work holding magazine, a loading arm having means for engaging and transferring a workpiece from said magazine to said face plate, means for transferring a workpiece from said magazine to said loading arm comprising a sliding member and means for actuating same, and a guide member movable with said sliding member to a position slightly beyond said face plate.

8. In a grinding machine, a grinding wheel, work rotating means comprising a face plate, a work holding magazine, a loading arm having means for engaging and transferring a workpiece from said magazine to said face plate, a guide plate for guiding said workpiece from said magazine to said face plate, means for positioning said guide plate beyond the surface of said face plate so that the edge of said face plate will not interfere with the transfer of a workpiece from said guide plate.

9. In a grinding machine, a grinding wheel, a rotatable face plate, a work feeder, a loading arm having means for engaging and transferring a workpiece from said work feeder to said face plate, means on said loading arm for holding said workpiece against said face plate, a guide plate for guiding said workpiece from said work feeder to said face plate, means for positioning said guide plate with its surface beyond the surface of said face plate in an axial direction so that the space between said guide plate and said face plate will not interfere with the movement of the workpiece, and means operable when said grinding wheel is in grinding position to retract said guide plate to a point behind the surface of said face plate in preparation for the removal of a workpiece from said face plate.

10. In a grinding machine, a grinding wheel, work rotating means comprising a face plate, a work holding magazine, a loading arm having means for engaging and transferring a workpiece from said magazine to said face plate, means for transferring a workpiece from said magazine to said loading arm comprising a sliding member and means for actuating same, a guide member movable with said sliding member to a position slightly beyond said face plate, a plunger on said sliding member for transferring a workpiece from said magazine to said loading arm, and control means operable when said grinding wheel is in grinding position to reverse said sliding member to reset said plunger and to retract said guide plate to a point behind the surface of said face plate.

11. In a grinding machine, a grinding wheel, work rotating means comprising a face plate, a work holding magazine, a loading arm having means for engaging and transferring a workpiece from said magazine to said face plate, a guide plate for guiding said workpiece from said magazine to said face plate, means for positioning said guide plate beyond the surface of said face plate so that the edge of said face plate will not interfere with the transfer of a workpiece from said guide plate, and means operable after said workpiece has been placed on said face plate to position said guide plate behind said face plate so that said guide plate will not interfere with the removal of a finished workpiece from said face plate.

12. In a grinding machine, a grinding wheel, a rotatable face plate, a work holding magazine, a loading arm having means for engaging and transferring a workpiece from said magazine to said face plate, means on said loading arm for rotatably holding said workpiece against said face plate, a guide plate for guiding said workpiece from said magazine to said face plate, the surface of said guide plate extending beyond the surface of said face plate in an axial direction so that the gap between said guide plate and said face plate will not interfere with the movement of the workpiece, and means operable when said grinding wheel is in grinding position to retract said guide plate to a point behind said face plate so that said guide plate does not interfere with the removal of a workpiece from said face plate.

13. In a grinding machine, a grinding wheel, work rotating means comprising a face plate, a work holding magazine, a loading arm having means for engaging and transferring a workpiece from said magazine to said face plate, a work feeding device for transferring a workpiece from said magazine to said loading arm, means on said loading arm for rotatably holding a workpiece against said face plate, a guide plate for guiding said workpiece from said magazine to said face plate, the surface of said guide plate extending beyond the surface of said face plate in an axial direction so that the gap between said guide plate and said face plate will not interfere with the movement of said workpiece, and means operable after said workpiece is on said face plate to reset said work feeding device and to retract said guide plate to a point behind said face plate in an axial direction so that said guide plate will not interfere with the removal of a workpiece from said face plate.

14. In a grinding machine, a bed, a grinding wheel, work rotating means comprising a face plate, a work holding magazine, a loading arm having means for engaging and transferring a workpiece from said magazine to said face plate, a guide plate for guiding said workpiece from said magazine to said face plate, the surface of said guide plate extending beyond the surface of said face plate so that the gap between said guide plate and said face plate will not interfere with the transfer of a workpiece to said face plate, and means operable when said grinding wheel is in grinding position to retract said guide plate to a point behind said face plate when a finished workpiece is to be removed from said face plate to said guide plate.

References Cited in the file of this patent

UNITED STATES PATENTS

| | | |
|---|---|---|
| 2,874,518 | Balsiger | Feb. 24, 1959 |
| 2,884,747 | Lehman | May 5, 1959 |
| 2,927,406 | Terp | Mar. 8, 1960 |